(12) United States Patent
Takechi et al.

(10) Patent No.: US 10,327,433 B2
(45) Date of Patent: Jun. 25, 2019

(54) DUAL-BEARING REEL

(71) Applicant: Shimano Inc., Sakai, Osaka (JP)

(72) Inventors: Kunio Takechi, Sakai (JP); Motohiro Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 139 days.

(21) Appl. No.: 15/413,669

(22) Filed: Jan. 24, 2017

(65) Prior Publication Data

US 2017/0280698 A1 Oct. 5, 2017

(30) Foreign Application Priority Data

Mar. 29, 2016 (JP) .................................. 2016-066649

(51) Int. Cl.
| | |
|---|---|
| *A01K 89/01* | (2006.01) |
| *A01K 89/015* | (2006.01) |
| *A01K 89/00* | (2006.01) |
| *A01K 89/06* | (2006.01) |

(52) U.S. Cl.
CPC ........ *A01K 89/0192* (2015.05); *A01K 89/006* (2013.01); *A01K 89/0186* (2015.05); *A01K 89/0193* (2015.05); *A01K 89/01925* (2015.05); *A01K 89/06* (2013.01)

(58) Field of Classification Search
CPC ............ A01K 89/0192; A01K 89/0186; A01K 89/006; A01K 89/015
See application file for complete search history.

(56) References Cited

U.S. PATENT DOCUMENTS

| | | | | | |
|---|---|---|---|---|---|
| 1,469,649 | A | * | 10/1923 | Sinkula .............. | A01K 89/0192 242/323 |
| 4,390,140 | A | * | 6/1983 | Karlsson ............ | A01K 89/0155 242/289 |
| 5,222,995 | A | * | 6/1993 | Sato ................... | A01K 89/0192 242/258 |
| 5,762,280 | A | * | 6/1998 | Takahashi .......... | A01K 89/0192 242/310 |
| 5,878,972 | A | * | 3/1999 | Okada ................ | A01K 89/0117 242/299 |
| 5,984,221 | A | * | 11/1999 | Kim .................... | A01K 89/033 242/289 |

(Continued)

FOREIGN PATENT DOCUMENTS

| | | | | |
|---|---|---|---|---|
| JP | 3031909 U | * | 12/1996 | ....... A01K 89/01916 |
| JP | 2003144021 A | | 5/2003 | |

*Primary Examiner* — Emmanuel M Marcelo

(74) *Attorney, Agent, or Firm* — United IP Counselors, LLC

(57) ABSTRACT

A handle is rotatably attached to a first reel body. A second reel body has a cylindrical shape, and is an interval apart from the first reel body in an axial direction. A spool is disposed between the first reel body and the second reel body. A mount includes a mount surface facing in a first direction to contact the fishing rod when the dual-bearing reel is mounted to the fishing rod. The second reel body includes an outer peripheral surface and an outer lateral surface. The outer lateral surface faces outward in the axial direction, and the outer peripheral surface of the second reel body has a width narrower towards a first directional end of the second reel body than towards a second directional end of the second reel body. The second directional end is opposite to the first direction end.

16 Claims, 4 Drawing Sheets

(56) References Cited

U.S. PATENT DOCUMENTS

| | | | | |
|---|---|---|---|---|
| 5,988,548 | A * | 11/1999 | Chapman | A01K 89/0192<br>242/310 |
| 6,422,498 | B1 * | 7/2002 | Littau | A01K 89/0155<br>242/288 |
| 2008/0277516 | A1 * | 11/2008 | Young | A01K 89/0192<br>242/310 |
| 2010/0327098 | A1 * | 12/2010 | Hyun | A01K 89/015<br>242/301 |
| 2011/0011966 | A1 * | 1/2011 | Takechi | A01K 89/0192<br>242/255 |
| 2015/0272103 | A1 * | 10/2015 | Blosch | A01K 89/0192<br>242/311 |

* cited by examiner

DUAL-BEARING REEL

CROSS-REFERENCE TO RELATED APPLICATIONS

This application claims priority to Japanese Patent. Application No. 2016-066649 filed on Mar. 29, 2016, the entirety of which is hereby incorporated by reference in its entirety.

BACKGROUND

Technical Field

The present disclosure relates to a dual-bearing reel.

Background Information

A dual-bearing reel includes a handle, a first reel body, a second reel body and a spool. The handle is rotatably attached to the first reel body. The first reel body and the second reel body are disposed at an interval apart in an axial direction. The spool is disposed between the first reel body and the second reel body.

As described in Japan Laid-open Patent Application Publication No. 2003-144021, a user might operate either a fishing rod or the spool while holding a reel unit of the dual-bearing reel, composed of the first and second reel bodies, from the second reel body side with a so-called "palming" technique. When palming, the user holds the reel unit together with the fishing rod by one hand (the left hand when the dual-bearing reel is of a right-handle type) while holding the handle by the other hand.

Now it is assumed to increase the width of the spool in the aforementioned type of dual-bearing reel so as to increase the amount of fishing line to be wound about the spool. The second reel body is herein disposed away from the fishing rod. This possibly results in difficulty in palming the dual-bearing reel.

BRIEF SUMMARY

It is an object of the present disclosure to provide a dual-bearing reel that can be easily palmed.

A dual-bearing reel according to an aspect of the present disclosure is mountable to a fishing rod. The dual-bearing reel includes a handle, a first reel body, a second reel body, a spool and a mount. The first reel body is a member to which the handle is rotatably attached. The second reel body is disposed at an interval apart from the first reel body in an axial direction of the spool. The second reel body has a cylindrical shape. The spool is disposed between the first reel body and the second reel body. The mount includes a mount surface. The mount surface faces in a first direction and contacts the fishing rod when the dual-bearing reel is mounted to the fishing rod. The second reel body includes an outer peripheral surface and an outer lateral surface. The outer lateral surface faces outward in the axial direction. The outer peripheral surface of the second reel body has a width narrower towards a first directional end of the second reel body than towards a second directional end of the second reel body. The second directional end is located oppositely to the first direction end.

According to this construction, the width of the second reel body is narrower towards the first directional side than towards the second directional side. As a result, when palming the second reel body, a user can be reliably given a space for putting a thumb on the second directional end of the second reel body. Simultaneously, the user can easily palm the second reel body.

The second reel body can include a recess. The recess abuts the outer peripheral surface and the outer lateral surface on the first directional end of the second reel body.

The recess can be a chamfer. The recess is between the outer peripheral surface and the outer lateral surface.

The chamfer can be provided throughout a circumference of the second reel body. The chamfer can have a width wider towards the first directional end of the second reel body than towards the second directional end of the second reel body. It should be noted that the second directional end is located oppositely to the first directional end.

The width of the chamfer can gradually get wider towards the first direction.

The dual-bearing reel forwardly releases a fishing line. The width of the chamfer can be narrower towards a front part of the second reel body than towards a rear part of the second reel body.

The outer lateral surface can have an outer peripheral edge extending in a perpendicular direction to the axial direction in a front view. Alternatively, the outer lateral surface can have an outer peripheral edge tilting relatively to the axial direction in a front view.

Overall, according to the present disclosure, the dual-bearing reel can be easily palmed.

BRIEF DESCRIPTION OF THE DRAWINGS

Referring now to the attached drawings which form a part of this original disclosure.

DETAILED DESCRIPTION OF EMBODIMENTS

A dual-bearing reel according to a preferred embodiment of the present disclosure will be hereinafter explained with reference to the attached drawings. It should be noted that in the following explanation, the term "axial direction." refers to the extending direction of a rotational axis O of a spool. The term "axially inside" refers to a direction approaching to the spool in the axial direction whereas the term "axially outward" refers to a direction away from the spool in the axial direction. The term "circumferential direction" refers to the circumferential direction of an imaginary circle about the rotational axis O. The term "radial direction" refers to the radial direction of the imaginary circle about the rotational axis O. The term "forward" refers to a fishing line releasing direction of the dual-bearing reel.

<Dual-Bearing Reel>

Figure 1:
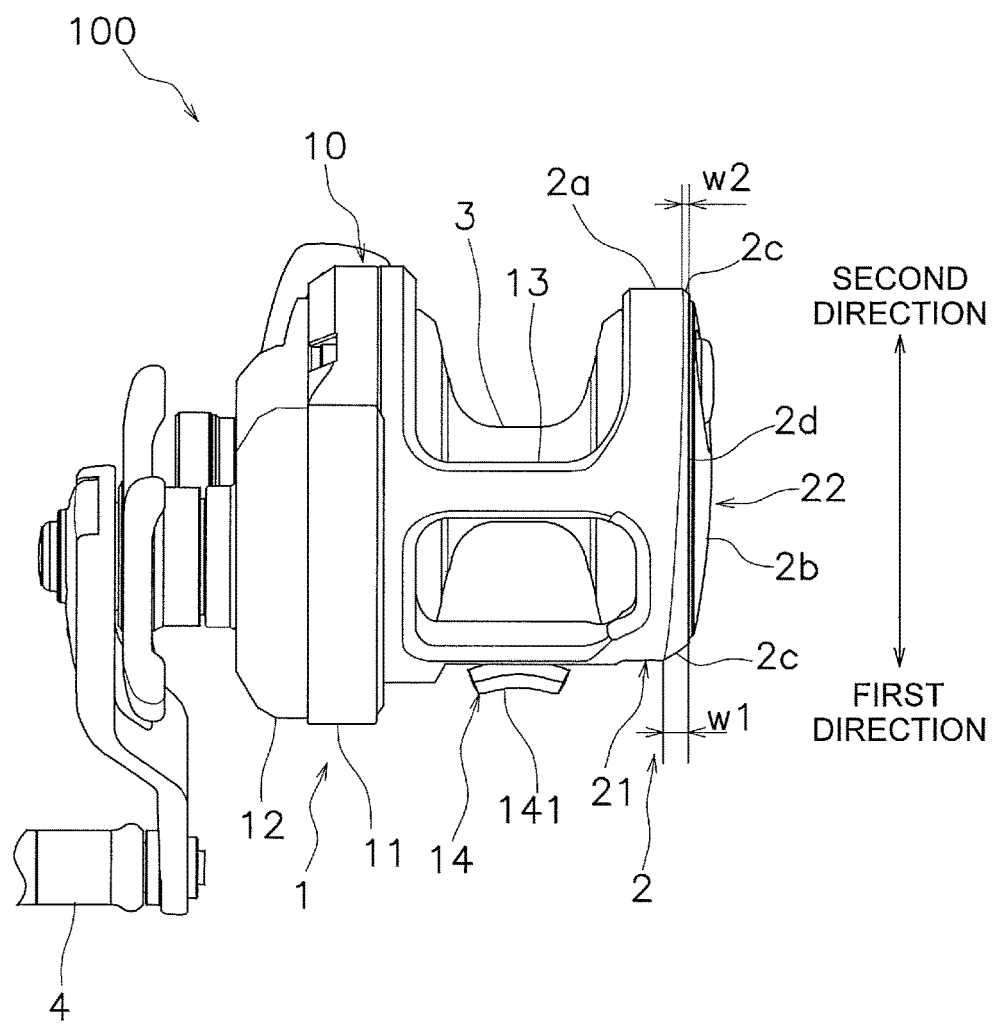
FIG. 1 is a front view of a dual-hearing reel.
Figure 2:
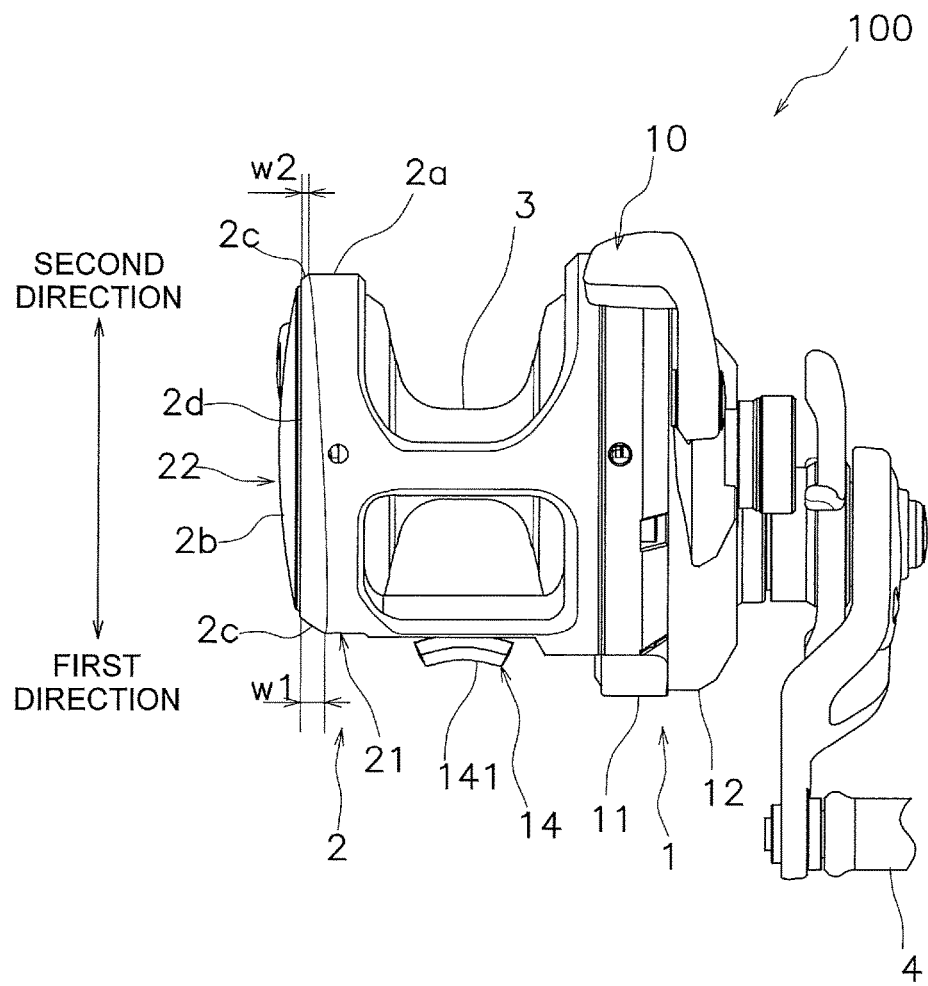
FIG. 2 is a rear view of the dual-bearing reel.
Figure 3:
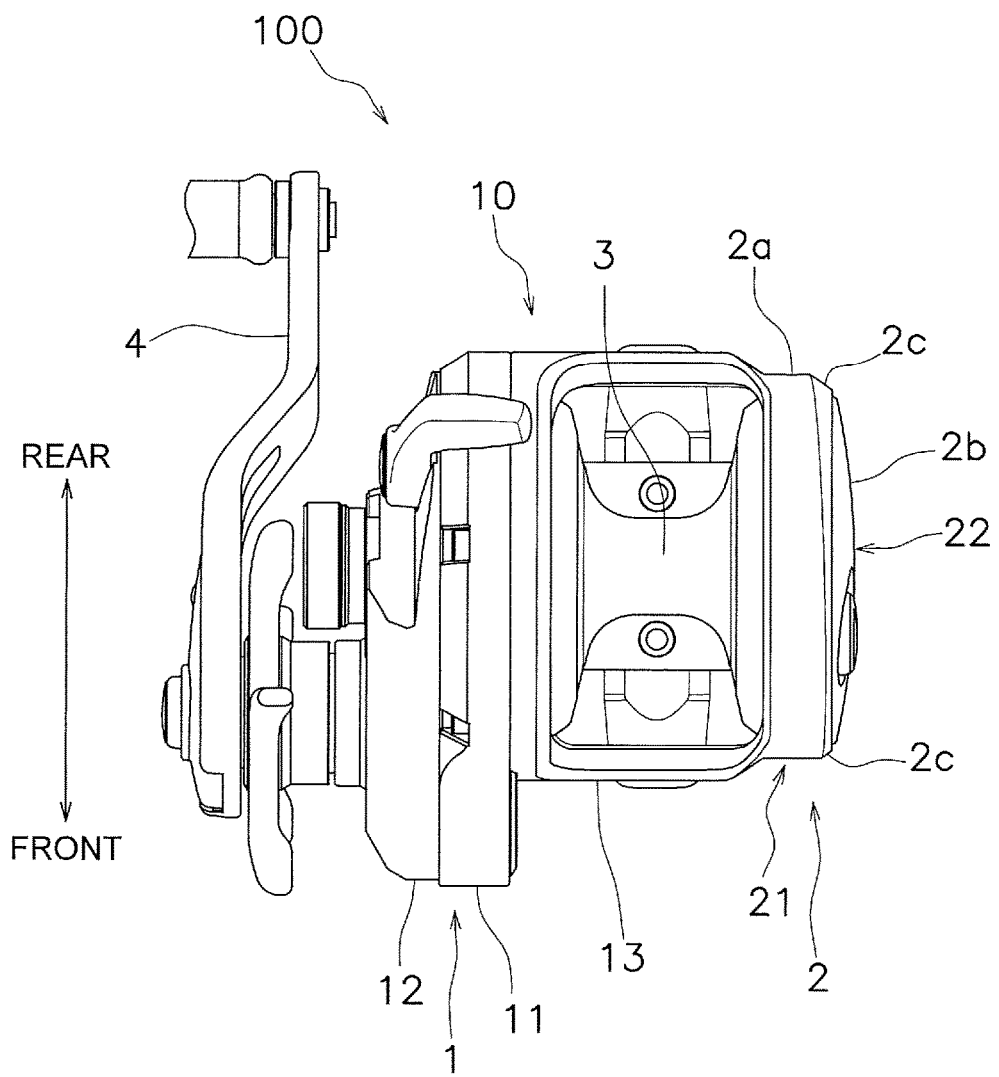
FIG. 3 is a plan view of the dual-bearing reel.

As shown in FIGS. 1 to 3, a dual-bearing reel 100 is mountable to a fishing rod. The dual-bearing reel 100 includes a first reel body 1, a second reel body 2, a spool 3, a handle 4 and a rotation transmission mechanism 6 (see FIG. 4).

<First Reel Body>

The first reel body 1 is a member to which the handle 4 is rotatably attached. The first reel body 1 includes an internal space. The rotation transmission mechanism 6 is accommodated in the internal space of the first reel body 1. The first reel body 1 includes a first cylindrical part 11 and a first cover 12. The internal space is defined by the first cylindrical part 11 and the first cover 12.

<Second Reel Body>

The second reel body 2 is disposed at an interval apart from the first reel body 1 in the axial direction. The spool 3 is disposed between the first reel body 1 and the second reel body. The first and second reel bodies 1 and 2 compose a reel unit 10. The second reel body 2 has a cylindrical shape.

The second reel body 2 includes a second cylindrical part 21 and a second cover 22. The second cylindrical part 21 is coupled to the first cylindrical part 11 through at least one coupling part 13. It should be noted that the at least one coupling part 13 extends in the axial direction. The first cylindrical part 11, the second cylindrical part 21 and the at least one coupling part 13 are integrated and compose a frame of the reel unit 10. For example, the first cylindrical part 11, the second cylindrical part 21 and the at least one coupling part 13 are integrally formed by die-cast molding of aluminum alloy.

Amount 14 is attached to a predetermined one of the at least one coupling part 13. The mount 14 is a member for mounting the dual-bearing reel 100 to the fishing rod. The mount 14 extends in a back-and-forth direction. The mount 14 includes a mount surface 141. The mount surface 141 faces in a first direction. In other words, the first direction refers to a direction in which the mount surface 141 faces. In FIGS. 1 and 2, a downward direction corresponds to the first direction. When the dual-bearing reel 100 is mounted to the fishing rod, the mount surface 141 contacts the fishing rod.

The second cover 22 covers the axially outer end surface of the second cylindrical part 21. The second cover 22 has a disc shape. The second cover 22 is detachable from the second cylindrical part 21. It should be noted that the second cover 22 can be integrated with the second cylindrical part 21.

The second reel body 2 includes an outer peripheral surface $2a$, an outer lateral surface $2b$ and a chamfer $2c$ (exemplary recess). The outer peripheral surface $2a$ is a surface that faces radially outward from the second reel body 2 having a cylindrical shape. The outer peripheral surface $2a$ corresponds to the outer peripheral surface of the second cylindrical part 21.

The outer lateral surface $2b$ is a surface that faces axially outward. Specifically, the outer lateral surface $2b$ faces rightward in FIGS. 1 and 3, and faces leftward in FIG. 2. The outer lateral surface $2b$ corresponds to the outer lateral surface of the second cover 22. In the front view, an outer peripheral edge $2d$ of the outer lateral surface $2b$ extends in a perpendicular direction to the axial direction. The outer lateral surface $2b$ curves to bulge outward in the axial direction. It should be noted that in the front view, the outer peripheral edge $2d$ of the outer lateral surface $2b$ is seen as a line segment connecting the upper end and the lower end of the outer lateral surface $2b$. The line segment extends in the perpendicular direction to the axial direction. It should be rioted that the outer peripheral edge $2d$ is not necessarily made in the shape of a line segment completely perpendicular to the axial direction in the front view.

The chamfer $2c$ abuts the outer peripheral surface $2a$ and the outer lateral surface $2b$. The chamfer $2c$ is formed by chamfering the outer peripheral edge of the axially outer end of the second reel body 2. It should be noted that in the present preferred embodiment, the chamfer $2c$ is provided on the axially outer end of the second cylindrical part 21. The chamfer $2c$ is provided along the outer peripheral edge of the second cylindrical part 21. The chamfer $2c$ extends in an annular shape. In other words, the chamfer $2c$ is provided throughout the circumference of the second reel body 2. The chamfer $2c$ tilts to face axially outward and radially outward.

The width of the chamfer $2c$ is inconstant in the circumferential direction. A width w1 of the chamfer $2c$ in the first directional end of the second reel body 2 is greater than a width w2 of the chamfer $2c$ in the second directional end of the second reel body 2. It should be noted that the width of the chamfer $2c$ refers to the axial dimension of the chamfer $2c$. The width of the chamfer $2c$ gets wider from the second directional end to the first directional end of the second reel body 2. Although not limited to a particular value, the width w1 of the chamfer $2c$ in the first directional end of the second reel body 2 can be around 3 to 6 min. On the other hand, the width w2 of the chamfer $2c$ in the second directional end of the second reel body 2 can be around 1 to 3 mm. Difference between the width w1 and the width w2 can be around 2 mm.

Thus, the width w1 of the chamfer $2c$ in the first directional end of the second reel body 2 is greater than the width w2 of the chamfer $2c$ in the second directional end of the second reel body 2. Therefore, the width of the outer peripheral surface $2a$ is narrower towards the first directional end of the second reel body 2 than towards the second directional end of the second reel body 2. As a result, when palming the second reel body 2, a user can be reliably given a space for putting the thumb on a second directional part of the second reel body 2. Simultaneously, the user can easily palm the second reel body 2.

As shown in FIG. 3, the width of the chamfer $2c$ is narrower towards the front part of the second reel body 2 than towards the rear part of the second reel body 2. This shape enables a user to palm the second reel body 2 as easily as possible.

<Spool>

Figure 4:
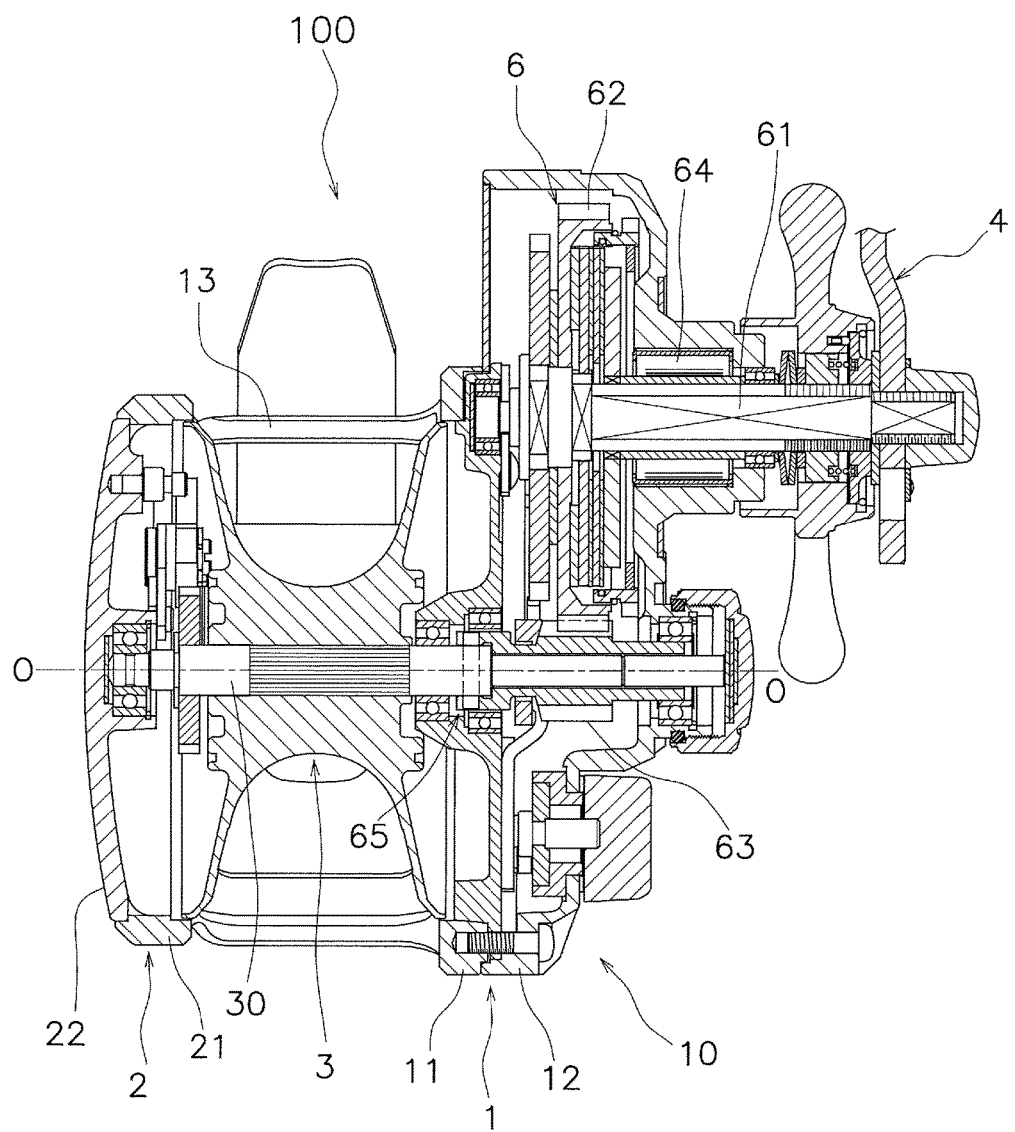
FIG. 4 is a cross-sectional view of the dual-bearing reel.

The spool 3 is rotatably disposed between the first reel body 1 and the second reel body 2. A fishing line is wound onto the outer peripheral surface of the spool 3. As shown in FIG. 4, the spool 3 is fixed to a spool shaft 30 and is unitarily rotated with the spool shaft 30. It should be noted that the spool shaft 30 extends between the first reel body 1 and the second reel body 2. The spool shaft 30 is rotatably supported by the first and second reel bodies 1 and 2 through bearing members and so forth.

<Handle>

The handle 4 is rotatably mounted to the first reel body 1. When described in detail, the handle 4 is mounted to a drive shaft 61 protruding from the first reel body 1. Rotation of the handle 4 is transmitted to the spool 3 through the rotation transmission mechanism. 6.

<Rotation Transmission Mechanism>

The rotation transmission mechanism 6 is a mechanism that transmits the rotation of the handle 4 to the spool 3. The rotation transmission mechanism 6 is disposed in the internal space of the first reel body 1. When described in detail, the rotation transmission mechanism 6 includes the drive shaft 61, a drive gear 62 and pinion gear 63.

The drive shaft. 61 is coupled to the handle 4, and is unitarily rotated with the handle 4. It should be noted that the drive shaft 61 is prevented from rotating in the fishing line releasing direction by a one-way clutch 64.

The drive gear 62 is mounted to the drive shaft 61 and is unitarily rotated with the drive shaft 61. The pinion gear 63 is meshed with the drive gear 62. It should be noted that the pinion gear 63 has a tubular shape. The pinion gear 63 is coupled to the spool shaft 30 through a clutch mechanism 65. When the clutch mechanism 65 is turned into a clutch-on state, the pinion gear 63 and the spool shaft 30 are unitarily rotated. By contrast, when the clutch mechanism 65 is turned into a clutch-off state, the pinion gear 63 and the spool shaft 30 are rotatable relatively to each other. For example, the clutch mechanism 65 is composed of an engaging pin and an engaging recess. The engaging pin radially penetrates the spool shaft 30. The engaging recess is provided on the pinion gear 63. The clutch-on state and the clutch-off state of the clutch mechanism 65 are switched in accordance with axial movement of the pinion gear 63.

<Modifications>

One preferred embodiment of the present disclosure has been explained above. However, the present disclosure is not limited to the above, and a variety of changes can be made without departing from the scope of the present disclosure. For example, in the aforementioned preferred embodiment, the chamfer 2c is formed by C chamfering. However, the chamfer 2c can be formed by R chamfering.

Additionally, in the aforementioned preferred embodiment, the chamfer 2c has been exemplified as a recess. However, the recess is not limited to the chamfer 2c. For example, instead of the chamfer 2c, a rabbet or step can be provided as the recess.

Moreover, in the aforementioned preferred embodiment, the outer peripheral edge 2d of the outer lateral surface 2b extends in the direction perpendicular to the axial direction. Alternatively, the outer peripheral edge 2d can extend in a direction tilting relatively to the axial direction.

Furthermore, in the aforementioned preferred embodiment, the width of the chamfer 2c gradually gets wider from the second directional end to the first directional end of the second reel body 2. Alternatively, the width of the chamfer 2c can get wider in a stepwise manner.

What is claimed is:

1. A dual-bearing reel mountable to a fishing rod, the dual-bearing reel comprising:
   a first reel body;
   a handle rotatably attached to the first reel body;
   a second reel body having a cylindrical shape, the second reel body being an interval apart from the first reel body in an axial direction;
   a spool disposed between the first reel body and the second reel body; and
   a mount including a mount surface, the mount surface facing a first direction to contact the fishing rod when the dual-bearing reel is mounted to the fishing rod,
   the second reel body including an outer peripheral surface and an outer lateral surface, the outer lateral surface facing outward in the axial direction,
   the outer peripheral surface of the second reel body having a width narrower towards a first directional end of the second reel body in the first direction than towards a second directional end of the second reel body, the second directional end being opposite to the first directional end.

2. The dual-bearing reel according to claim 1, wherein the second reel body includes a recess, the recess being on the first directional end of the second reel body between the outer peripheral surface and the outer lateral surface.

3. The dual-bearing reel according to claim 2, wherein the recess is a chamfer abutting the outer peripheral surface and the outer lateral surface.

4. The dual-bearing reel according to claim 3, wherein the chamfer extends throughout a circumference of the second reel body, and
   the chamfer has a width wider towards the first directional end of the second reel body than towards the second directional end of the second reel body.

5. The dual-bearing reel according to claim 3, wherein a width of the chamfer gradually widens in the first direction.

6. The dual-bearing reel according to claim 3, wherein the dual-bearing reel forwardly releases a fishing line, and a width of the chamfer is narrower towards a front part of the second reel body than towards a rear part of the second reel body.

7. The dual-bearing reel according to claim 1, wherein the outer lateral surface has an outer peripheral edge extending in a perpendicular direction to the axial direction.

8. The dual-bearing reel according to claim 1, wherein the outer lateral surface has an outer peripheral edge tilting relative to the axial direction.

9. A dual-bearing reel mountable to a fishing rod, the dual-bearing reel comprising:
   a first reel body;
   a mount including a mount surface, the mount surface facing a first direction to contact the fishing rod when the dual-bearing reel is mounted to the fishing rod; and
   a second reel body having a cylindrical shape, the second reel body being an interval apart from the first reel body in an axial direction, the second reel body including an outer peripheral surface and an outer lateral surface, the outer lateral surface facing outward in the axial direction, the outer peripheral surface having a width narrower towards a first directional end of the second reel body in the first direction than towards a second directional end of the second reel body, the second directional end being opposite to the first directional end.

10. The dual-bearing reel according to claim 9, wherein the second reel body includes a recess, the recess being on the first directional end of the second reel body between the outer peripheral surface and the outer lateral surface.

11. The dual-bearing reel according to claim 10, wherein the recess is a chamfer abutting the outer peripheral surface and the outer lateral surface.

12. The dual-bearing reel according to claim 11, wherein the chamfer extends throughout a circumference of the second reel body, and
    the chamfer has a width wider towards the first directional end of the second reel body than towards the second directional end of the second reel body.

13. The dual-bearing reel according to claim 11, wherein a width of the chamfer gradually widens towards the first directional end.

14. The dual-bearing reel according to claim 11, wherein a width of the chamfer is narrower towards a front part of the second reel body than towards a rear part of the second reel body.

15. The dual-bearing reel according to claim 9, wherein the outer lateral surface has an outer peripheral edge extending in a perpendicular direction to the axial direction.

16. The dual-bearing reel according to claim 9, wherein the outer lateral surface has an outer peripheral edge tilting relative to the axial direction.

* * * * *